Nov. 29, 1932.  H. GRÜSS ET AL  1,888,984
APPARATUS FOR THE DETERMINATION OF THE CONTENTS
OF COMBUSTIBLE GASES IN GAS MIXTURES
Filed Nov. 29, 1927
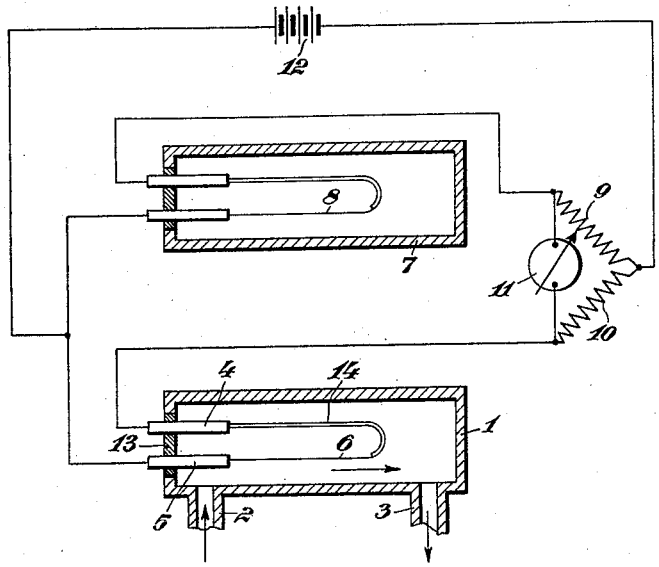
Inventors:
Heinz Grüss and Bruno Thiede
by Louks, Kehlenbeck & Farley
Attorneys.

Patented Nov. 29, 1932

1,888,984

UNITED STATES PATENT OFFICE

HEINZ GRÜSS, OF BERLIN-STAAKEN, AND BRUNO THIEDE, OF BERLIN-CHARLOTTEN-BURG, GERMANY, ASSIGNORS TO SIEMENS & HALSKE, AKTIENGESELLSCHAFT, OF SIEMENSSTADT, NEAR BERLIN, GERMANY, A CORPORATION OF GERMANY

APPARATUS FOR THE DETERMINATION OF THE CONTENTS OF COMBUSTIBLE GASES IN GAS MIXTURES

Application filed November 29, 1927, Serial No. 236,554, and in Germany December 10, 1926.

This invention relates to a method and arrangement for the determination of the contents of combustible gases in gas mixtures.

It is known to determine the contents of combustible gases in gas mixtures, more particularly in flue gases, by burning the gases in question, more particularly carbon monoxide and hydrogen, on an electrically heated test wire, preferably catalytically, and by measuring the resistance of the test wire. The heat of combustion of the gases to be determined changes the temperature and the resistance of the test wire, and this change of resistance forms the measure for the gas contents to be determined.

As the correct indications of such instruments depend chiefly on the uniform position of the measuring wire, for instance a sagging of the wire results in an increased convection of the passing gas, it is most important in the manufacture of the apparatus to see that the position of the wires in the measuring and in the comparison chamber should be exactly uniform and constant.

Up to now it has been attempted to comply with that condition by stretching the measuring wire centrally between two sockets in a tubular chamber. In this way, any control of the position of the wire after it has been fitted, is rendered impossible or very difficult.

This drawback is eliminated according to the invention by stretching the measuring wire on supports which in their turn are preferably secured in a jointly insulated socket, a curved tensioned wire member being preferably secured to one of said supports. The supports and the sockets are preferably arranged at a point which the gas current passes before reaching the measuring wire, in order to avoid precipitation on the insulated parts, of the water produced by the catalytic combustion on the wire.

A construction according to the invention is illustrated by way of example in the accompanying drawing. In a measuring chamber 1 are provided openings 2 and 3 through which the gas mixture to be tested is admitted and discharged in the direction of the arrows shown. Into the measuring chamber project two parts 4 and 5 of a non-oxidizable material which is a good conductor, for instance a silver gold pin or silver gold tube of a relatively large cross section. The pins 4 and 5 are arranged close to the inlet opening 2 for the gas current and insulated at 13 from the measuring chamber and from each other. They form supports for the testing wire 6 extending in the direction of flow of the gas and constituted, for instance, of platinum or platinum alloys. The testing wire 6 is secured at one end to the holding pin 5 and at the other end to a tensioned bent part 14 supported by the pin 4. The pins 4 and 5 assume during the heating of the test wire 6 a considerably lower temperature than the latter, not only because of their lower resistance, but because they are cooled by the current of gas, so that they undergo correspondingly smaller changes, such as in dimensions and electrical resistance. The test wire 6 is connected, in a manner well known in itself, with a comparison wire 8 situated in a comparison chamber 7, as well as with resistances 9 and 10, to a bridge connection, in the diagonal branch of which is arranged a galvanometer 11. The comparison chamber 7 is filled for instance with air. For feeding the bridge connection there is used for instance a battery 12. The checking before the mounting, of the systems comprising the measuring wire 6, holding pins 4, 5 and sleeve 13, and the erecting are easily accomplished. As is clear from the drawing, the insulating sleeve 13 and the pins 4, 5 and support 14 and wire 6 can be assembled externally of the chamber and mounted as a unit in a wall thereof. The comparison wire is arranged in a corresponding manner.

It will be noted that the bracket-like part 14 is provided at its right end with a curved portion through which it is connected to the test wire 6. This curved portion is in the nature of a flexed spring and tends to keep the wire 6 taut. When the temperature of the wire 6 rises during the catalytic combustion, the resulting increase in length is compensated by the tension of the curved portion of the part 14, so that the wire 6 is maintained in its original taut condition.

What we claim as our invention and desire to be secured by Letters Patent is:—

1. In an apparatus for determining the combustible components of a gas mixture, the combination of a compartment having an inlet and an outlet opening in the walls thereof for permitting the gas mixture to pass through said compartment in a definite direction, a wire having when heated catalytic properties, for producing combustion of the combustible components of the gas mixture, mounted within said compartment, means for heating said wire electrically comprising a source of electricity, a pair of electrically conductive non-oxidizable supports for said wire arranged side by side so as to project over said inlet opening, and a curved tensioned wire bracket secured at one end to one of said supports and at its other end to said wire thereby serving to keep said catalytic wire under tension and prevent sagging thereof.

2. The combination as set forth in claim 1, wherein said compartment is elongated and wherein said wire is straight and extends in the direction of the longitudinal axis of the compartment.

In testimony whereof we affix our signatures.

HEINZ GRÜSS.
BRUNO THIEDE.